Feb. 26, 1963 K. WILFERT ET AL 3,078,779
HEATING AND VENTILATING SYSTEM FOR A VEHICLE
Filed Dec. 2, 1958 2 Sheets-Sheet 1
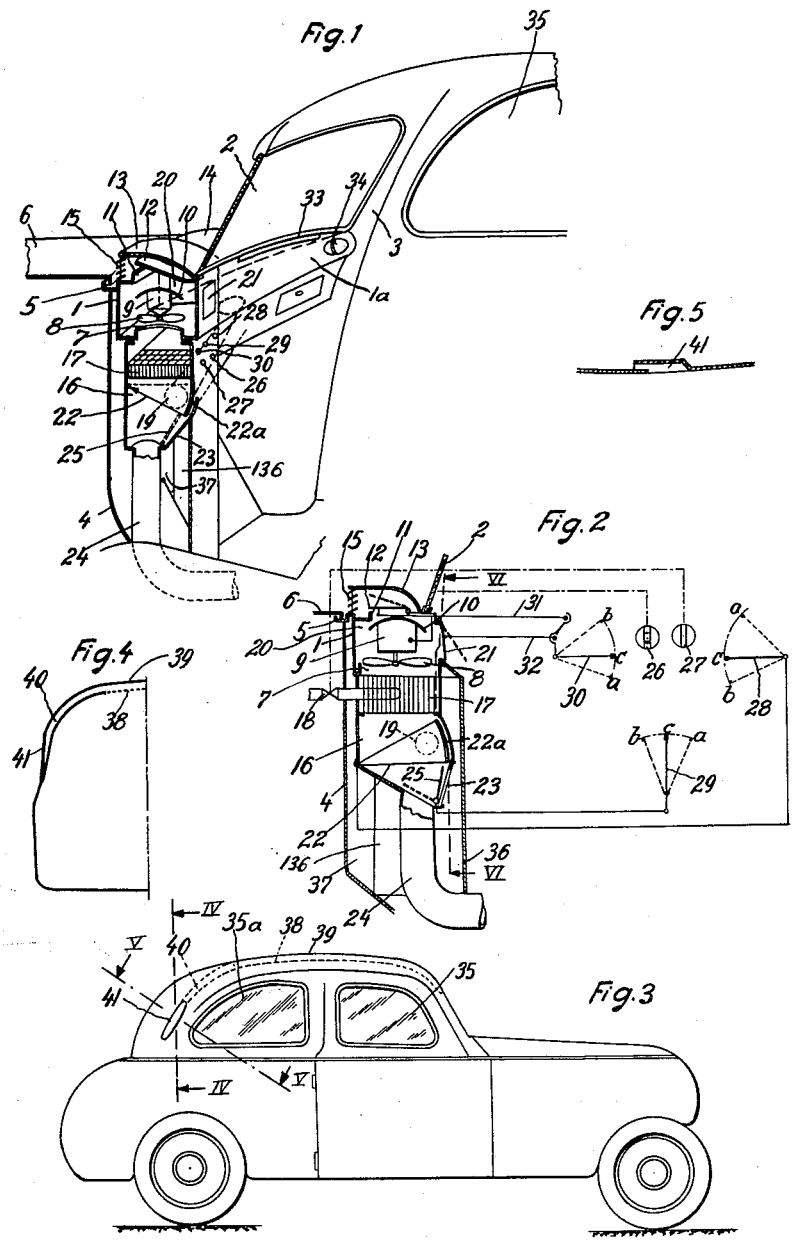
Inventors
KARL WILFERT
ERNST J. H. FIALA
BY
ATTORNEYS

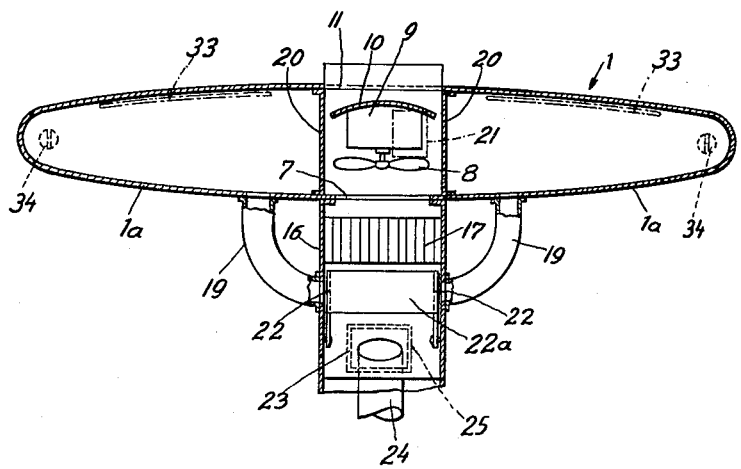

United States Patent Office 3,078,779
Patented Feb. 26, 1963

3,078,779
HEATING AND VENTILATING SYSTEM
FOR A VEHICLE
Karl Wilfert, Stuttgart-Degerloch, and Ernst J. H. Fiala, Sindelfingen, Kreis Boblingen, Germany, assignors to Daimler-Benz Aktiengesellschaft, Stuttgart-Unterturkheim, Germany
Filed Dec. 2, 1958, Ser. No. 777,619
Claims priority, application Germany Dec. 4, 1957
11 Claims. (Cl. 98—2)

Our invention relates to a heating and ventilating system for a vehicle, more particularly for a motor vehicle.

Increasing demands with respect to temperature control and ventilation in motor vehicles have led to the development of bulky heating and ventilating units requiring considerable space, thus rendering the installation in the motor hood difficult and requiring a complicated control linkage involving manually operable control elements which could not be readily disposed within easy reach for the driver.

It is the object of our invention to provide a heating and ventilating unit of compact structure which is effective and reliable in operation and capable of easy and convenient control. More specifically, it is the object of our invention to provide an improved heating and ventilating unit capable of installation in the vehicle outside of the motor compartment, thus leaving the latter free for the installation of an engine and of a transmission of considerable size and power.

Further objects of our invention will appear from a detailed description of a preferred embodiment of our invention following hereinafter with reference to the accompanying drawing. We wish it to be understood, however, that our invention is in no way limited to the details of such embodiment but is capable of numerous modifications within the scope of the appended claims and that the terms and phrases used in such detailed description have been chosen for the purpose of explaining the invention rather than that of restricting or limiting the same.

In the accompanying drawing

FIG. 1 is a perspective sectional view of the front portion of a motor car equipped with our novel heating and ventilating unit, FIG. 2 is a sectional view similar to that of FIG. 1 including a diagrammatic representation of the valve control means, FIG. 3 is a side view of a passenger car equipped with our heating and ventilating unit, FIG. 4 is the cross section taken through the body of the car shown in FIG. 3, such section being taken along the line IV—IV of FIG. 3, FIG. 5 is a partial section taken along the line V—V of FIG. 3, and FIG. 6 is a vertical sectional view of the heating and ventilating unit, the section being taken along line VI—VI of FIG. 2.

As shown in FIG. 1, a material element of the front wall of the passenger compartment of a motor car body is a hollow transverse beam 1 which is disposed below the wind screen 2 and is coextensive with the width of the vehicle extending from one door post 3 to the other, said beam having a rectangular cross section. The conventional front wall 4 of the passenger compartment body extends behind and below the transverse beam 1 and is formed with a transverse channel member 5 extending along its upper edge, such channel member being fixed to or formed integral with the rear wall of the transverse beam 1 and constituting a seat for a downwardly projecting flange 15 extending along the rear edge of the motor hood 6.

The hollow transverse beam 1 is provided with an inlet 11 provided in its top wall in front of the wind screen 2 and with an outlet 7 provided in the bottom wall of the hollow beam 1 and preferably formed by a circular opening registering with the impeller 8 of a fan mounted within the hollow beam for feeding air through the outlet 7 into a distributor box 16 which is mounted beneath the beam 1 and communicates with the outlet 7.

A radiator 17 is mounted within the distributor box and through a valve 18 is supplied with hot water derived from the heating system of the engine for heating the air stream issuing from the outlet 7. A plurality of air ducts communicates with the space provided in the distributor box 16 below the radiator 17 and valve means to be described hereinafter are provided in the distributor box to control the communication thereof with the ducts.

Preferably, the fan comprising the impeller 8 and a motor 9, the outlet 7 and the inlet 11 are disposed near the center of the beam to be spaced equal distances from the side walls of the body. The fan motor 9 is disposed beneath a bell 10 so as to be sheltered against moisture, the bell 10 being connected with the side walls of the hollow beam 1 by suitable brackets not shown so as to be disposed below the inlet 11. An adjustable wind-scooping lid 12 is mounted for pivotal adjustment about a horizontal hinge connecting its rear edge to the top wall of the hollow beam. Preferably, a flat hood 13 is provided in front of the wind screen 2 and covers the lid 12 and has a forwardly facing aperture for the admission of air, the hood 13 projecting upwardly from the top wall 14 of the transverse beam directly in front of the wind screen 2. The front aperture of the hood is screened by a plurality of superimposed forwardly and downwardly inclined strips constituting louvers serving the purpose of deflecting rain.

The air distributor box 16 extends downwardly from the transverse beam 1 and a pair of ducts 19 extend from ports provided in the side walls of the distributor box 16 to the outer sections 1a (FIG. 1) of the hollow transverse beam 1, the internal spaces of said outer sections being separated by suitable partitions 20 from the interior space of the central section of the beam which accommodates the fan and is preferably provided with a rearwardly facing aperture adapted to be closed by a pivotal cover 21, the upper edge of this cover being fixed to the rear wall of the hollow beam 1 by a horizontal hinge.

The lower portion of the rear wall of the distributor box 16 is provided with a rearwardly facing opening 23 for directing a stream of air into the vehicle and the valve means mentioned hereinabove include a pivotal valve member 22 for optionally interrupting the communication of the space provided in the distributor box 16 below the radiator 17 either with the aforementioned lateral ducts 19 or with the rearwardly facing opening 23. This pivotal valve member 22 preferably comprises a pair of parallel flat sheet metal arms extending in parallel vertical planes fore-and-aft of the vehicle and having their front ends pivotally connected to the bottom edge of the front wall of the box 16 for pivotal up and down movement and having their rear ends connected by a transverse shutter 22a adapted to be swung into registry with the opening 23. Another duct 24 extends from a port provided in the bottom wall of the distributor box 16 and leads rearwardly terminating in front of the rear seats of the vehicle.

The valve means mentioned hereinabove preferably include an additional valve member 25 which is pivotally connected to the front wall of the distributor box near the lower end thereof so as to be optionally pivotal either into a lower forward position in which it closes the duct 24, such position being shown in FIG. 2 by dotted lines, or into an upper rearward position shown in full lines in which it closes the opening 23.

The fan motor 9 is adapted to be put into and out of operation by a switch 26 and the hot water valve 18 is adjustable by a knob 27. A hand lever 28 is suitably connected with the valve member 22 for adjustment thereof and a hand lever 29 is suitably connected with the valve member 25 for pivotal adjustment thereof. A hand lever 30 is suitably connected by a linkage 32 with the pivotal cover 21 and by another linkage 31 with the adjustable wind-scooping lid 12, these linkages being so disposed that a manipulation of lever 30 which will open the lid 12 closes the cover 21 and that, vice versa, a manipulation of the lever 30 which opens the cover 21 will close the lid 12. Suitable springs not shown are included in the linkages and suitable detent means are provided for arresting the lever 30 in intermediate positions, such as the position $c$ disposed between the end positions $a$ and $b$. When the lever 30 assumes the position $c$, both the lid 12 and the cover 21 are closed as shown in FIG. 2, whereas in the position $a$ the lever 30 keeps the cover 21 fully opened and the lid 12 entirely closed. In the position $b$ the lever 30 keeps the cover 21 entirely closed and keeps the lid 12 entirely opened.

When the switch 26 is turned in clockwise direction, the fan motor 9 starts operation, initially at a low speed, and further rotation of the switch 26 increases such speed of operation. Hence, the switch 26 permits to control the fan output.

The valve 18 is adjustable by rotation of the knob 27 between a fully closed position and a fully opened position, whereby the heating effect of the radiator 17 may be controlled.

When the lever 28 assumes the position $a$, it maintains the valve member 22 in its upper position in which it closes the ducts 19 extending to the end sections 1a of the hollow transverse beam. When the lever 28 assumes its position $b$, it keeps the pivotal member 22 in its lower position in which it establishes free communication between the ducts 19 and the distributor box but fully closes the rearwardly facing opening 23. When the lever 28 assumes a central position $c$, it keeps the valve member 22 in a medium position in which it partly opens the duct 19 and the opening 23.

The spaces provided in the end sections 1a of the hollow transverse beam constitute lateral chambers which are provided with the conventional defroster nozzle openings 33 forming air discharge ports each directing a jet of air against the inner face of the wind screen pane. Moreover, the lateral chambers 1a of the transverse beam are provided with ports 34 capable of directing jets of air against the panes closing the lateral front windows 35. The ports 34 may be provided with suitable valve means and pivotal nozzles in the conventional manner.

Furthermore, our novel heating and ventilating system includes an upright sheet element 36 (omitted in FIG. 1) mounted in the vehicle behind the distributor box 16 in registry with the rearwardly facing opening 23 for intercepting the stream of air directed from the opening 23 into the vehicle, as such stream is liable to make the passengers seated on the front seats feel uncomfortable. Preferably, the upright sheet element 36 is formed by a vertical sheet metal strip having lateral forwardly extending flanges 136 establishing a U-shaped cross sectional profile. This sheet metal member will deflect the stream of air issuing from the opening 23 causing it to pass through gaps 37 provided between the flanges of member 36 and the wall 4 and permitting the stream after passing through the gaps 37 to flow rearwardly at a reduced speed which will not cause any uncomfortable draft. Preferably, the sheet element 36 is fixed to the beam 1 and carries the manually operable control members 26 to 30 described hereinabove and, if desired, a radio apparatus, the control members 26 to 30 and that of the radio apparatus being disposed within convenient reach from the driver near the steering wheel. In order to afford a discharge of the air from the passenger space of the body without causing any draft and in order to permit the doors of the vehicle to be easily closed without requiring banging of the doors, we preferably provide the roof of the body with a head-lining 38 pervious to air and mounted in spaced relationship from the roof and provide the body with apertures 41 establishing a free communication between the atmosphere and the space between the roof 39 and the head-lining 38 (FIGS. 3 and 4). Preferably, the body has a double-walled rear portion including an internal space 40 and this space 40 communicates with the space between the roof and the head-lining and also communicates with the outside atmosphere by the apertures 41 which may be formed as gaps disposed at the level of and behind the lateral windows 35, 35a at the rearwardly sloping region of the body. As illustrated in FIG. 5, the gaps 41 may face rearwardly. Therefore, the air flowing into the passenger space through the inlet 11 may leave the passenger space through the pores of the head-lining 38 and through the interior space 40 of the double wall to be discharged through the gaps 41 without causing any draft. Moreover, the interior space 40 of the double wall constitutes a transverse communication between the gap 41 on the right-hand side and the gap 41 provided on the left-hand side of the vehicle. As a result, lateral winds hitting the car in parked condition cannot produce any draft in the passenger space. When the doors are closed, the air pressed into the passenger space by the doors can readily escape through the apertures 41 without producing any internal superpressure in the passenger space. As a result, the doors can be easily closed without banging them.

The disposition of the fan motor 9 in sheltered position below the bell 10 and the provision of the louvers 15 will provide a safeguard against the entry of rain or snow into the heating unit. Moreover, the inlet 11 and the outlet 7 are preferably provided with upstanding flanges for the purpose of retaining water and chutes for the discharge of water may be provided at the wall connecting points by suitable flanges, whereby any water that might enter the transverse hollow beam 1 may be disposed of.

If desired, the valve member 25 may be disposed outside of the pivotal valve member 22. Also one or more separating shutters may be provided for subdividing the unit into a pair of individually controllable sections each being provided for one section of the body.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. Heating and ventilating system for a vehicle having a passenger compartment provided with a wind screen, said system comprising a hollow transverse box-shaped beam having a top wall, a bottom wall, a front wall and a rear wall, said walls being coextensive with the width of the passenger compartment and coordinated to the front wall thereof, said rear wall of said beam being disposed below said wind screen, internal partitions in said hollow beam subdividing the internal space thereof into a central chamber and two lateral chambers, said central chamber being provided with an inlet in said top wall for outside air and with an outlet in said bottom wall, a fan mounted within said central chamber for feeding air through said outlet, a distributor box mounted beneath said beam and communicating with said outlet, a radiator mounted within said distributor box for heating the air stream issuing from said outlet, air ducts communicating with said distributor box and with said lateral chambers, valve means provided in said distributor box and controlling the communication thereof with said ducts, and an adjustable wind-scooping lid for controlling said inlet, said lateral chambers being provided with air discharge ports.

2. System as claimed in claim 1 in which said distributor box is disposed near the center of said beam.

3. System as claimed in claim 1 in which said hollow transverse beam is disposed in front of and below said wind screen having said inlet in front of said wind screen, said combination further comprising a hood provided in front of said wind screen and covering said inlet and having a forwardly facing aperture, and louvers within said opening, said louvers comprising superimposed forwardly and downwardly inclined strips.

4. System as claimed in claim 1 further comprising a fan-driving motor disposed within said hollow transverse beam above said fan and below said inlet, and a bell covering said motor and disposed beneath said inlet.

5. System as claimed in claim 1 further comprising defroster nozzle means carried by said beam and communicating with said lateral chambers, a pair of said ducts extending laterally from said distributor box to said lateral chamber for conducting heated air thereto and a third one of said ducts extending from the bottom of said distributor box towards the rear of said vehicle, the lower portion of the rear wall of said distributor box being provided with a rearwardly facing opening for directing a stream of air into said vehicle, the rear wall of said central chamber being provided with an aperture, said air-conditioning system further comprising an adjustable cover for said aperture.

6. System as claimed in claim 5, in which said valve means include a pivotal valve member mounted in said distributor box to be movable between two end positions and operative in one of said end positions to close said opening and to open said air ducts and operative in the other one of said end positions to close said air ducts and to open said opening, and an additional pivotal valve member mounted in said distributor box for closing alternatively either said rearwardly facing opening or said third one of said ducts extending from the bottom of said distributor box towards the rear of said vehicle.

7. System as claimed in claim 1 in which a rear wall of said box confining a space provided in the lower portion of said distributor box below said radiator is provided with a rearwardly facing opening for directing a stream of air into said vehicle, said system further comprising an upright sheet element mounted in the vehicle behind said distributor box in registry with said rearwardly facing opening for intercepting said stream of air directed into said vehicle.

8. System as claimed in claim 7 in which said sheet element is fixed to said beam and has lateral forwardly extending flanges.

9. System as claimed in claim 7 further comprising manually operable control members connected with said valve means for adjustment thereof and mounted on said sheet element.

10. A vehicle having a closed body comprising a roof and side walls, said side walls having double-walled rear portions forming a hollow space located behind the rear lateral windows of said body, a head-lining pervious to air and mounted in spaced relationship from said roof, said head-lining extending to said double-walled rear portions, apertures in the outer wall of each of said rear portions establishing communication between said roof and said head-lining, each of said outer walls having portions adjacent said apertures overlapping one of said apertures and forming a rearwardly facing gap.

11. A vehicle having a closed body in which the roof of said body is provided with a head-lining pervious to air and mounted in spaced relationship from said roof, the body having a double-walled rear portion and being provided with apertures in said rear portion, the space between said roof and said head-lining communicating with the internal space of said double-walled rear portion so that said apertures and said internal space establish a communication between the atmosphere and said space, said apertures consisting of a pair of apertures only provided in the side walls of said body behind the rear windows therein, the front portion of said body being free of any aperture establishing a communication of said space with the atmosphere.

References Cited in the file of this patent

UNITED STATES PATENTS

| | | |
|---|---|---|
| 2,053,606 | Flammang | Sept. 8, 1936 |
| 2,146,826 | Knapp | Feb. 14, 1939 |
| 2,257,638 | Moore | Sept. 30, 1941 |
| 2,355,151 | Findley | Aug. 8, 1944 |
| 2,372,377 | Hans | Mar. 27, 1945 |
| 2,718,839 | Wilfert | Sept. 27, 1955 |
| 2,855,838 | Krubel | Oct. 14, 1958 |